United States Patent Office 3,019,986
Patented Feb. 6, 1962

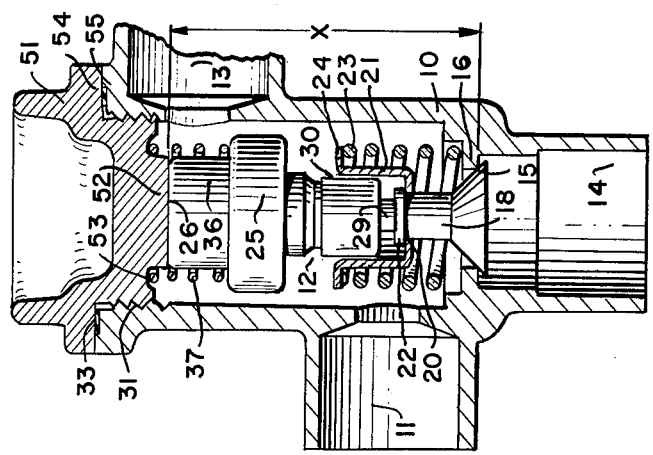
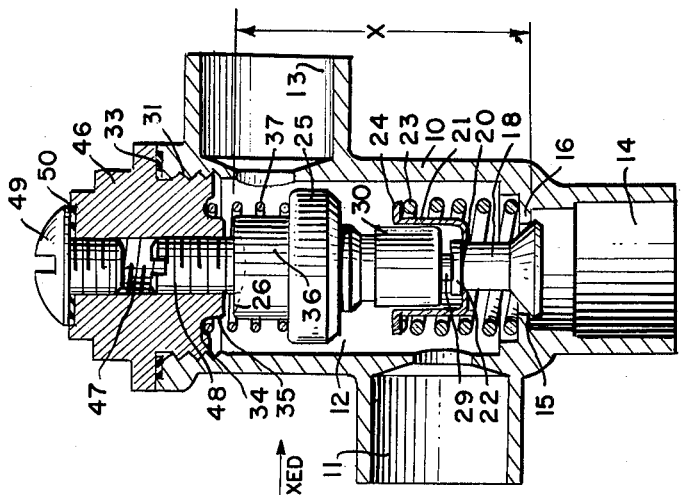
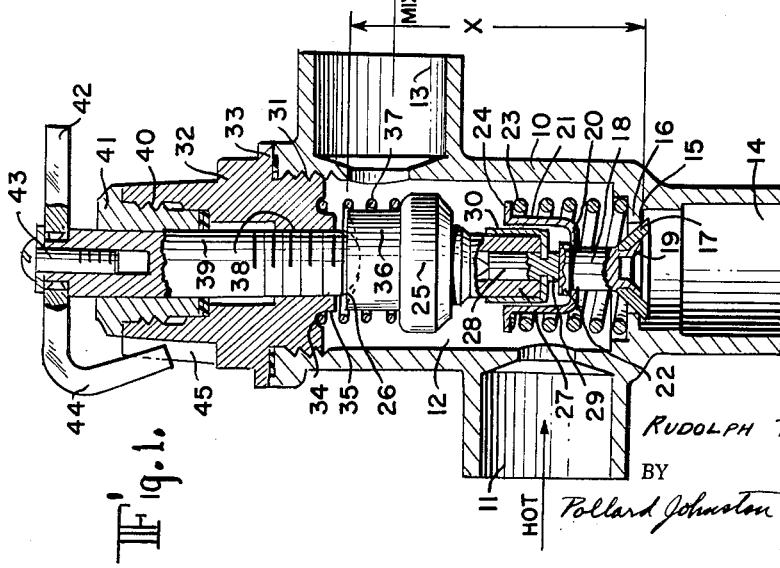

3,019,986
FLUID MIXING VALVE
Rudolph T. Schoerner, Cranston, R.I., assignor to Taco Heaters, Incorporated, Cranston, R.I., a corporation of New York
Filed June 21, 1957, Ser. No. 667,198
2 Claims. (Cl. 236—12)

The present invention relates to mixing valves, and particularly to new and improved mixing valves of the type employed in utility hot water systems or the like for preventing excessively hot water being supplied to household fixtures or the like.

Mixing or tempering valves of the above described type are known. They generally may be classified as valves with an adjustable or a fixed setting, and the former may be externally or internally adjustable. In prior known valves of this type, it is common practice to employ a movable temperature responsive means for controlling the opening and closing of either the hot or cold water inlets to the valve for effecting the mixing or tempering of hot water to prevent excessively hot water being supplied to household fixtures and the like.

In prior known valves that are designed as fixed setting valves, the temperature responsive element is designed to produce a maximum displacement within a relatively small temperature range. For example, maximum displacement may occur within a ten or fifteen degree temperature range with substantially little displacement occurring at temperatures below and above this narrow range. In prior known valves provided with an internal or external adjustable setting, the displaceable temperature responsive element must be designed to have a substantially constant rate of displacement over a substantially large range of temperatures in order to accommodate the adjustable settings of the valves.

The mounting of the temperature responsive element within prior known valves of this general type has presented problems in order to insure its proper functioning. Invariably, cages or yokes are required to support the temperature responsive element in proper relation to the valve it is to actuate as well as to the means for varying its effectiveness.

A principal object of this invention is to provide a mixing or tempering valve of simple design and minimum parts so that an externally adjustable, internally adjustable, and fixed setting mixing or tempering valve can be produced with maximum economy.

Another object of this invention is to provide a mixing or tempering valve body capable of accommodating interchangeable common parts so that a line of valves may be provided including an internally adjustable, an externally adjustable, and a fixed setting mixing or tempering valve by simply employing one of three interchangeable closure plugs in the valve body.

Another object of this invention is to provide such a line of mixing or tempering valves in which each may be operated by a common interchangeable temperature responsive element.

Another object of the invention is to provide such a line of mixing or tempering valves in which the temperature responsive element may be supported within the valve body without the use of a yoke or cage, and in a manner to facilitate its accommodating the internal adjustable, the external adjustable, and the fixed setting mechanism.

One aspect of the invention may include the employment of a valve body having two inlets and one outlet wherein the valve body may be closed by a removable plug axially aligned with one of the inlets to the valve body. In another aspect of the invention, the inlet axially aligned with the closure plug may be provided with a spring biased poppet valve including a guiding element for cooperation with one end of a temperature responsive element. By providing a removable closure plug for the valve body in axial alignment with the inlet having the spring pressed poppet valve, it is evident that the end of the temperature responsive element opposite that which cooperates with the guiding element of the poppet valve may be loosely and removably attached to the closure plug by a helical spring or the like.

In still another aspect of the invention, the interchangeable plugs for the valve body may accommodate separate adjusting means for controlling the effectiveness of the temperature responsive element, thereby making it possible to provide any one of three different types of mixing or tempering valves by simply employing a selected or preselected interchangeable closure plug for the valve body.

The above as well as other objects, advantages and features of the invention will become apparent from the following description and accompanying drawings, which are merely exemplary.

In the drawings:

FIGURE 1 is a sectional elevational view of an externally adjustable mixing or tempering valve to which the principles of the invention have been applied;

FIG. 2 is a view similar to FIG. 1 of an internally adjustable mixing or tempering valve to which the principles of the invention have been applied; and FIG. 3 is a view similar to FIG. 1 of a fixed setting mixing or tempering valve to which the principles of the invention have been applied.

Referring to the drawing, and particularly to FIG. 1, the principles of the invention are shown as applied to a mixing or tempering valve including a body 10 having an inlet 11 leading to a mixing chamber 12. An outlet 13 is also in communication with chamber 12, as is a second inlet 14.

The second inlet 14 may have a valve seat 15 formed in a wall 16 separating inlet 14 from chamber 12. A flexible or other suitable poppet valve element 17 may be fixed to a cylindrical holder 18 by a peened over flange 19 for a reason that will appear later.

The holder 18 may extend through an opening 20 within the base of a cup-shaped guiding member 21, and a flange 22 on holder 18 may retain it in cooperating position relatively to the guiding member 21. A compression spring 23 may be located between the wall 16 and a flange 24 on the upper end of the hollow cylindrical guiding member 21. It is evident from the foregoing that the element 17 must be fixed to the holder 18 when the spring pressed mechanism is assembled, by peening over the flange 19 as previously described.

The temperature responsive element may comprise a hollow body 25 closed at its upper dished end 26 and provided with an open cylinder lower end 27. A piston 28 may be located within the cylinder 27 and its external end 29 may abut or rest on the top of the carrier 18. A cup-shaped cover or guard 30 neoprene or the like may slidingly surround the exterior of the cylinder 27 and be connected to the external end 29 of the piston 28 such serving to hold the piston 28 in place when the assembly is removed.

The valve body 10 may be provided with a threaded opening 31 in axial alignment with the valve seat 15 and, consequently, with the temperature responsive element 25. A plug 32 may be threaded into the opening 31 and a gasket 33 may be provided between it and the top of valve body 10. The plug 32 may be formed with an annular groove or recess 34 forming a boss 35 that is concentric to the longitudinal axis of the plug 32. The diameter of the boss 35 may be substantially the same as a portion 36 of the element 25 so that a helical spring 37 may frictionally engage both the boss 35 and the portion 36. The helical spring 37 is normally tight wound, and in assembled relation the coils are somewhat separated so that it normally urges the element 25 toward the plug 32. This will permit the element 25 to be withdrawn with the plug 32 if desired.

The plug 32 may be provided with a threaded bore 38 for threadingly receiving a threaded shaft 39 having a curved end that cooperates with the dished end 26 of the temperature responsive element 25. The threaded shaft 39 extends upwardly through a threaded counterbore 40 in plug 32, and a stuffing box 41 is threaded into the counterbore 40 for preventing leakage of water past the threaded shaft 39.

A handle 42 may be keyed or otherwise fastened to the end of shaft 39 by a screw 43 providing an external means for turning the threaded shaft 39, and a pointer 44 may be provided for indicating the angular position of the shaft 39.

From the foregoing, it is evident that helical spring 37 maintains the element 25 in abutting relation with the lower end of the threaded shaft 39 and in axial alignment with the cylindrical guiding member 21.

The temperature responsive element 25 may be hollow in form and may enclose expansible crystalline material such as that disclosed in the patent to Vernet 2,115,501 dated April 26, 1938. The expansible crystalline material should possess the characteristic of linear expansion where the expansion rate is substantially constant and uniform over a relatively wide temperature range.

The inlet 11 may be connected to a hot water line; the inlet 14 may be connected to a cold water line; and the outlet 13 may be connected to a line leading to household fixtures or the like. With the valve in the condition as shown in FIG. 1, only water from inlet 11 will pass into chamber 12 which if excessive in temperature acts upon the temperature responsive element 25 causing the expansible material therein to force the piston 28 and holder 18 in a direction to open closure element 17 against the action of the spring 23. Cold water then flows into chamber 12, mixing with and tempering the hot water therein, and the mixed or tempered water then flows through outlet 13. Turning handle 42 in a manner to axially move shaft 39 into chamber 12 causes the effectiveness of the element 25 to increase since it lessens the distance X between the point of resistance between element 25 and shaft 39 on the one hand, and the seat 15 on the other hand. This, accordingly, causes the movement of piston 28 to open closure 17 quicker and to a greater extent than it would if the distance X were increased. Therefore, the lessening of this distance X means cooler water through outlet 13, and the increasing of this distance X means hotter water through outlet 13. It is a simple matter to calibrate the angular position of the handle 42 in relation to the temperature variation of the water passing through outlet 13 and to provide an index 45 in register with the pointer 44 of handle 42.

Referring to FIG. 2, the principles of the invention have been applied to a mixing or tempering valve including parts identical with corresponding parts of the valve of FIG. 1, with the exception that the closure plug for the valve body 10 is different. In FIG. 2, a plug 46 is threaded into the opening 31 of the valve body 10. The plug 46 includes a threaded passage 47 extending through said plug along its longitudinal axis.

A stud 48 may be threaded into the passage 47 extending into chamber 12 and having its inner end maintained in abutting relation with the dished end 26 of the temperature responsive element 25 by the helical spring 37. The length of stud 48 may be such that in any of its axial positions of adjustment, its outer end is well below the top of the plug 46. This permits the employment of a screw 49 in the passage 47 to prevent unauthorized adjustment of the stud within the passage 47, and, consequently, unauthorized varying of the temperature of the mixed or tempered water flowing through the outlet 13. A gasket 50 may be employed to prevent leakage of water past screw 49.

The operation of the valve of FIG. 2 is identical to that of the valve of FIG. 1, with the exception that the former is adjusted internally, whereas the latter is adjusted externally.

Referring to FIG. 3, the principles of the invention are shown as applied to a tempering valve wherein all of the parts are identical with those of the valves shown in FIGS. 1 and 2, with the exception again of the closure plug for the valve body 10. In FIG. 3, a plug 51 is threaded into the opening 31 of the valve body 10, and it may include a boss 52 formed by a recess or groove 53. The plug 51 includes a flange 54 that seats against an annular surface 55 on the valve body 10. The construction of plug 51 is such that the distance between the effective surface of flange 54 and the inner surface of boss 52 is critical and dependent upon the desired maximum temperature of the water passing through the outlet 13. In other words, the distance X in FIG. 3 may be changed by machining the boss 52 in a manner to provide a predetermined distance the inner surface thereof protrudes into chamber 12, or gaskets 33 may be used having different thicknesses to produce the same result.

From the foregoing it is evident that an externally adjustable, an internally adjustable, and a fixed setting mixing or tempering valve can be produced by merely employing one of three interchangeable closure plugs for a common valve body within which are located parts common to each of the three types of valves. Furthermore, no special cages or yokes are required to support the temperature responsive element, which latter is also common to all three valves.

Although the principles of the new and improved mixing or tempering valve have been shown and described in detail to fully disclose the invention, it will be evident that numerous changes may be made in such details, and certain features may be used without others without departing from the principles of the invention.

What is claimed is:

1. In a fluid mixing or tempering valve, a body having a chamber therein; an inlet to said chamber; an outlet from said chamber; another inlet to said chamber; a removable plug forming one wall of said chamber; a valve seat forming part of said other inlet; a valve for said other inlet; resilient means adapted to urge said valve into cooperation with said valve seat including a cup-shaped guiding element; a temperature responsive element, a spring encircling a portion of said element and said plug wherein the spring element engages the element and plug for holding the same in assembled relation, said element being in said chamber and in abutting relation with said plug; means between said valve and said element telescopically cooperating with said cup-shaped guiding element for causing said temperature responsive element to open and close said valve in response to temperature variations applied to said element in said chamber; and means associated with said plug to vary the distance between said valve seat and the end of said element away from said seat.

2. In a fluid mixing or tempering valve, a body having a chamber with at least two inlets and at least one outlet, there being a continuous passage through said chamber between one of said inlets and said outlet; an opening in said chamber in axial alignment with one of said inlets; a valve for said one of said inlets; a cup shaped guiding means connected to said valve, said cup shaped guiding means and said valve being mounted to remain in said body; spring means connected to said cup shaped guiding means resiliently urging the same in a direction normally causing closing of said valve; a temperature responsive element in said chamber having a substantially constant and uniform rate of linear expansion for a relatively wide temperature range, said element being telescopically movable into said guiding means and removable with respect thereto; a preselectable plug for the opening in said body having means removably connecting said plug with said temperature responsive element so that when said plug is removed from said body, said temperature responsive means is removed therewith and the plug and temperature responsive means can be separated therefrom; and means associated with said preselectable plug for varying the effectiveness of said temperature responsive element, so that said temperature responsive element will be operated in a selected range.

References Cited in the file of this patent

UNITED STATES PATENTS

| | | |
|---|---|---|
| 1,055,307 | Barton | Mar. 11, 1913 |
| 1,879,344 | Lawler | Sept. 27, 1932 |
| 1,942,270 | Resek | Jan. 2, 1934 |
| 2,246,148 | Stephenson | June 17, 1941 |
| 2,248,447 | Wood | July 8, 1941 |
| 2,326,096 | Dillman | Aug. 3, 1943 |
| 2,515,885 | Midyette | July 18, 1950 |
| 2,636,776 | Vernet | Apr. 28, 1953 |
| 2,807,421 | Carlson | Sept. 24, 1957 |
| 2,837,282 | Budde | June 3, 1958 |

FOREIGN PATENTS

| | | |
|---|---|---|
| 348,793 | Great Britain | May 21, 1931 |
| 673,278 | Great Britain | June 4, 1952 |